US012548862B2

(12) United States Patent
Tian et al.

(10) Patent No.: US 12,548,862 B2
(45) Date of Patent: Feb. 10, 2026

(54) ELECTRODE ASSEMBLY AND BATTERY

(71) Applicant: NINGDE AMPEREX TECHNOLOGY LIMITED, Ningde (CN)

(72) Inventors: Jiao Tian, Ningde (CN); Yongliang Guo, Ningde (CN); Chao Chen, Ningde (CN); Yujiang Xu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 1055 days.

(21) Appl. No.: 17/219,835

(22) Filed: Mar. 31, 2021

(65) Prior Publication Data

US 2021/0288389 A1 Sep. 16, 2021

Related U.S. Application Data

(63) Continuation of application No. PCT/CN2020/079016, filed on Mar. 12, 2020.

(51) Int. Cl.
*H01M 50/54* (2021.01)
*H01M 10/05* (2010.01)
*H01M 10/0585* (2010.01)
*H01M 50/533* (2021.01)

(52) U.S. Cl.
CPC ..... *H01M 50/533* (2021.01); *H01M 10/0585* (2013.01); *H01M 50/54* (2021.01)

(58) Field of Classification Search
None
See application file for complete search history.

(56) References Cited

FOREIGN PATENT DOCUMENTS

| CN | 203218374 U | 9/2013 | |
|---|---|---|---|
| CN | 105449261 A | 3/2016 | |
| CN | 205376669 U | 7/2016 | |
| CN | 205828576 U | 12/2016 | |
| CN | 205828577 U | 12/2016 | |
| CN | 107171028 A | 9/2017 | |
| CN | 109449478 A | 3/2019 | |
| CN | 209357857 U | 9/2019 | |
| CN | 110544796 | * 12/2019 | ............ H01M 10/04 |
| CN | 110544796 A | 12/2019 | |
| JP | 2010049967 A | 3/2010 | |

OTHER PUBLICATIONS

International Search Report and Written Opinion, PCT/CN2020/079016, Nov. 27, 2020, 8 pgs.—No Translation Available—.

* cited by examiner

*Primary Examiner* — Barbara L Gilliam
*Assistant Examiner* — Angela J Martin
(74) *Attorney, Agent, or Firm* — XSENSUS LLP

(57) ABSTRACT

An electrode assembly, including a first electrode plate, a second electrode plate, and a separator. The separator is disposed between the first electrode plate and the second electrode plate. The electrode assembly further includes a first tab disposed on the first electrode plate, and a second tab and a third tab that are disposed on the second electrode plate. Projections of the first tab, the second tab, and the third tab on the first electrode plate do not overlap. The electrode assembly is provided with a multi-tab structure to achieve purposes of enhancing a current-carrying capacity of the battery and reducing a temperature rise.

18 Claims, 15 Drawing Sheets

ELECTRODE ASSEMBLY AND BATTERY

CROSS-REFERENCE TO RELATED APPLICATIONS

This application is a continuation application of PCT Application No. PCT/CN2020/079016, filed on Mar. 12, 2020 and entitled "ELECTRODE ASSEMBLY AND BATTERY", which is incorporated herein by reference in its entirety.

TECHNICAL FIELD

This application relates to the field of batteries, and in particular, to an electrode assembly and a battery that contains the electrode assembly.

BACKGROUND

The application of 5G is accompanied with higher requirements imposed by consumers on battery performance of a portable electronic product such as a smart phone and a tablet computer.

Currently, inside a jelly-roll battery cell, a single-surface-coated region of a negative electrode plate exists. To be specific, only an outer surface of a negative current collector of the negative electrode plate is coated with an active material layer, and an inner surface of the negative current collector is not coated with any active material layer. During cycles, a negative electrode expands when a battery is charged or discharged. The single-surface-coated region expands irregularly upward or downward, thereby leading to deformation of the battery cell and reducing an energy density of the battery cell.

SUMMARY

In view of the foregoing situation, it is necessary to provide an electrode assembly capable of overcoming irregular expansion of a single-surface-coated region and a battery containing the electrode assembly.

An embodiment of this application provides an electrode assembly, including a first electrode plate, a second electrode plate, and a separator. The separator is disposed between the first electrode plate and the second electrode plate. The electrode assembly is formed by winding the first electrode plate, the separator, and the second electrode plate. The first electrode plate includes a single-surface-coated region. The single-surface-coated region is located in a winding initiation layer of the electrode assembly and forms a first uncoated region and a second uncoated region that are disposed oppositely. The electrode assembly further includes a first connecting piece. The first connecting piece is disposed on a side of the first uncoated region, the side facing the second uncoated region. The second uncoated region is connected to a side of the first connecting piece, the side facing back from the first uncoated region. The first uncoated region and the second uncoated region are connected into a whole by the first connecting piece, thereby increasing internal rigidity of the battery cell and avoiding irregular expansion of the single-surface-coated region.

In some embodiments, the first connecting piece is double-sided tape, and is affixed onto a surface in the first uncoated region, the surface facing the second uncoated region.

In some embodiments, the separator overlays a surface coated with no active material layer in the single-surface-coated region, and the first connecting piece is disposed between the first uncoated region and the separator.

Further, a second connecting piece is disposed between the second uncoated region and the separator, and the second connecting piece is configured to fixedly connect the separator and the second uncoated region.

In some embodiments, projections of the first connecting piece and the second connecting piece do not overlap in a thickness direction of the electrode assembly.

In some embodiments, a third connecting piece is disposed on a side of the separator, the side facing back from the first uncoated region; and the first uncoated region, the separator, and the second uncoated region are fixedly connected by the third connecting piece.

In some embodiments, the first connecting piece extends in a width direction of the electrode assembly, and the first connecting piece overlays and connects the first uncoated region and the second uncoated region.

In some embodiments, the electrode assembly further includes a strut, and the strut is sandwiched between the first uncoated region and the second uncoated region.

Further, the first connecting piece is disposed between the first uncoated region and the strut.

In some embodiments, in a length direction of the electrode assembly, a length of the first connecting piece is less than or equal to a length of the electrode assembly.

In some embodiments, in a thickness direction of the electrode assembly, a thickness of the first connecting piece is less than or equal to a thickness of the first electrode plate.

In some embodiments, the first connecting piece includes a plurality of connecting units, and the plurality of connecting units are spaced out on a surface of the single-surface-coated region, the surface being coated with no active material layer.

An embodiment of this application further provides a battery, including an electrode assembly and a package. The electrode assembly is any of the electrode assemblies described above. The package accommodates the electrode assembly, and tabs of the electrode assembly extend out of the package.

In the electrode assembly, a first connecting piece is disposed to connect the first uncoated region and the second uncoated region. Therefore, the two uncoated regions form a whole to enhance rigidity of an inner coil interface of the battery cell and rigidity of the battery cell, suppress battery cell deformation caused by irregular expansion of the single-surface-coated region during charging and discharging cycles, and increase an energy density of the battery cell.

REFERENCE NUMERALS

Figure 1:
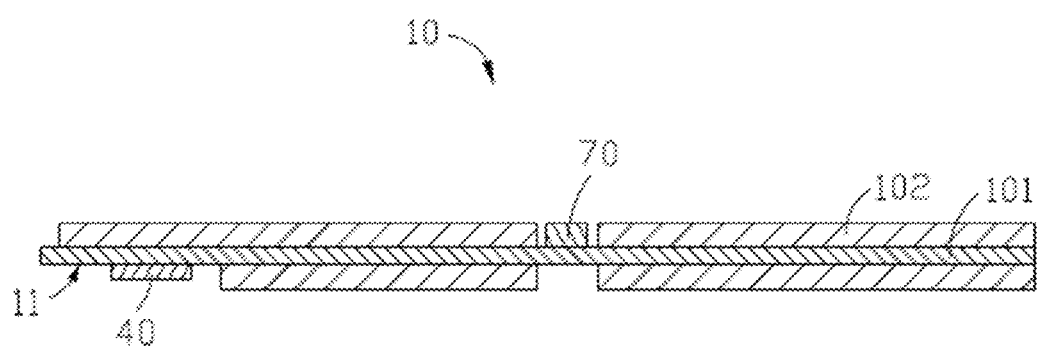
FIG. 1 is a schematic diagram of an expanded structure of a first electrode plate of an electrode assembly according to a first embodiment.

Electrode assemblies 100, 200, 300, 400, 500
First electrode plate 10
First current collector 101
Active material layer 102
Single-surface-coated region 11
First uncoated region 12
Second uncoated region 13
Empty foil region 14
Second electrode plate 20
Separator 30
Ending separator 31
First connecting piece 40
Second connecting piece 50
Third connecting piece 60
First tab 70
Second tab 80
Bonding piece 90
Strut 91
Battery 600
Package 601

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application. All other embodiments derived by a person of ordinary skill in the art based on the embodiments of this application without making any creative efforts shall fall within the protection scope of this application.

It needs to be noted that an element referred to as being "fixed to" another element may directly exist on the other element or may be fixed to the other element through an intermediate element. An element considered to be "connected to" another element may be directly connected to the other element or may be connected to the other element through an intermediate element. An element considered to be "disposed on" another element may be directly disposed on the other element or may be disposed on the other element through an intermediate element. The terms "vertical", "horizontal", "left", "right" and similar expressions used herein are merely for ease of description.

Unless otherwise defined, all technical and scientific terms used herein have the same meanings as usually understood by a person skilled in the technical field of this application. The terms used in the specification of this application herein are merely intended for describing specific embodiments but are not intended to limit this application. The term "and/or" used herein is intended to include any and all combinations of one or more related items preceding and following the term.

An embodiment of this application provides an electrode assembly, including a first electrode plate, a second electrode plate, and a separator. The separator is disposed between the first electrode plate and the second electrode plate. The electrode assembly is formed by winding the first electrode plate, the separator, and the second electrode plate. The first electrode plate includes a single-surface-coated region. The single-surface-coated region is located in a winding initiation layer of the electrode assembly and forms a first uncoated region and a second uncoated region that are disposed oppositely. The electrode assembly further includes a first connecting piece. The first connecting piece is disposed on a side of the first uncoated region, the side facing the second uncoated region. The second uncoated region is connected to a side of the first connecting piece, the side facing back from the first uncoated region. The first uncoated region and the second uncoated region are connected into a whole by the first connecting piece.

In the electrode assembly, a first connecting piece is disposed to connect the first uncoated region and the second uncoated region. Therefore, the two uncoated regions form a whole to enhance rigidity of an inner coil interface of the battery cell and rigidity of the battery cell, suppress battery cell deformation caused by irregular expansion of the single-surface-coated region during charging and discharging cycles, and increase an energy density of the battery cell.

The following describes some embodiments of this application in detail. To the extent that no conflict occurs, the following embodiments and the features in the embodiments may be combined with each other.

First Embodiment

Figure 2:
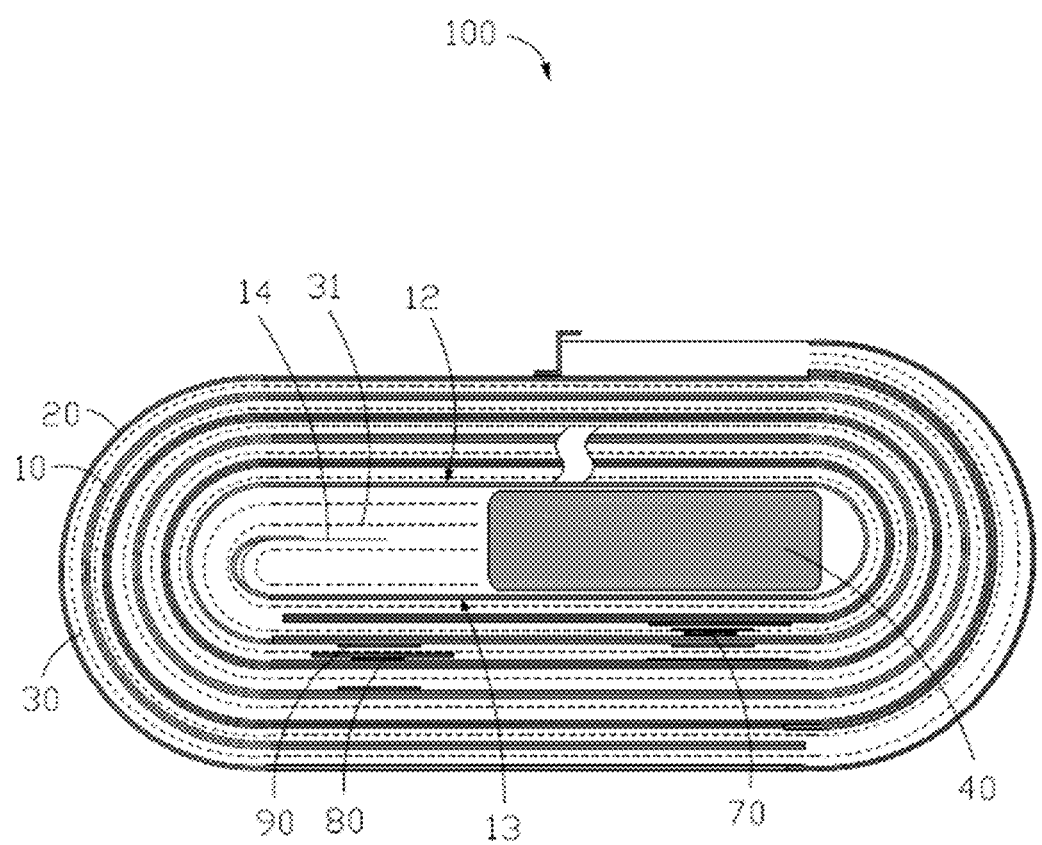
FIG. 2 is a schematic diagram of a jelly-roll structure of an electrode assembly according to a first embodiment.
Figure 3:
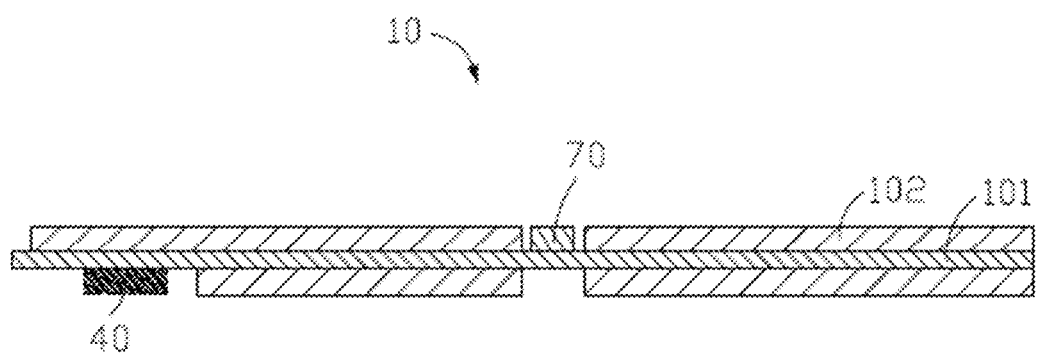
FIG. 3 is a schematic diagram of an expanded structure of a first electrode plate according to an extended embodiment.
Figure 4:
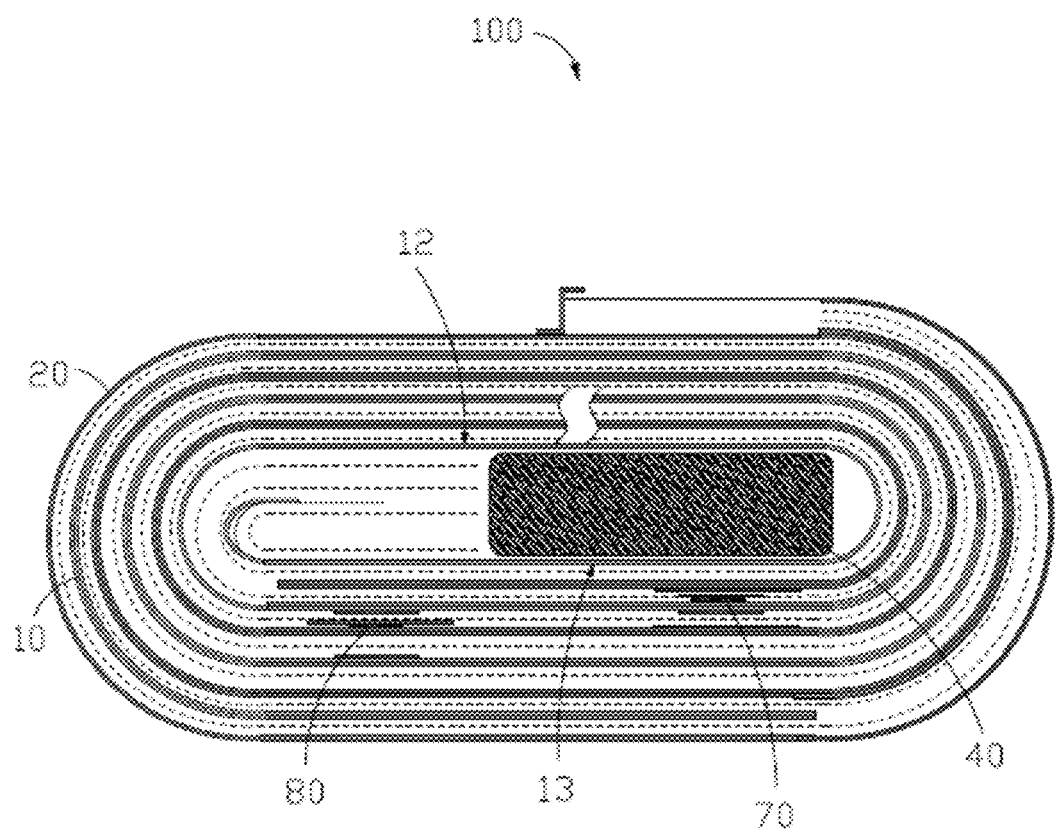
FIG. 4 is a schematic diagram of a jelly-roll structure of an electrode assembly containing the first electrode plate shown in FIG. 3.
Figure 5:
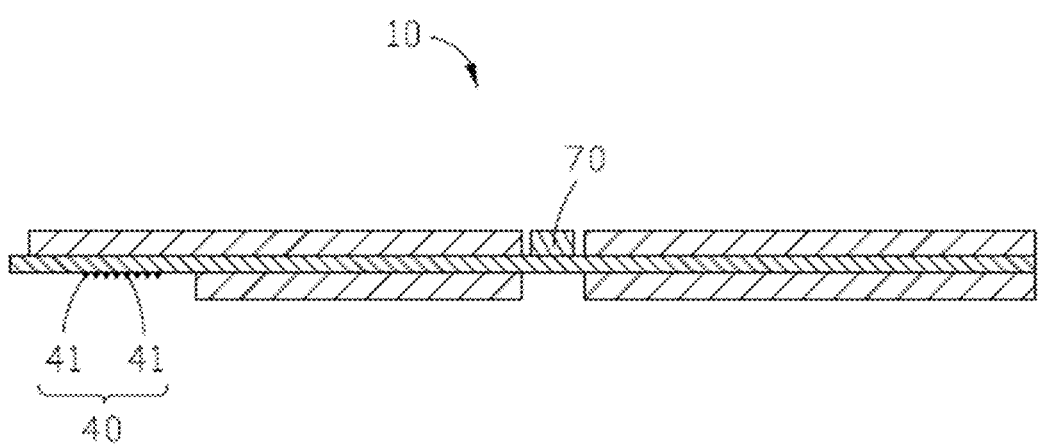
FIG. 5 is a schematic diagram of an expanded structure of a first electrode plate according to another extended embodiment.
Figure 6:
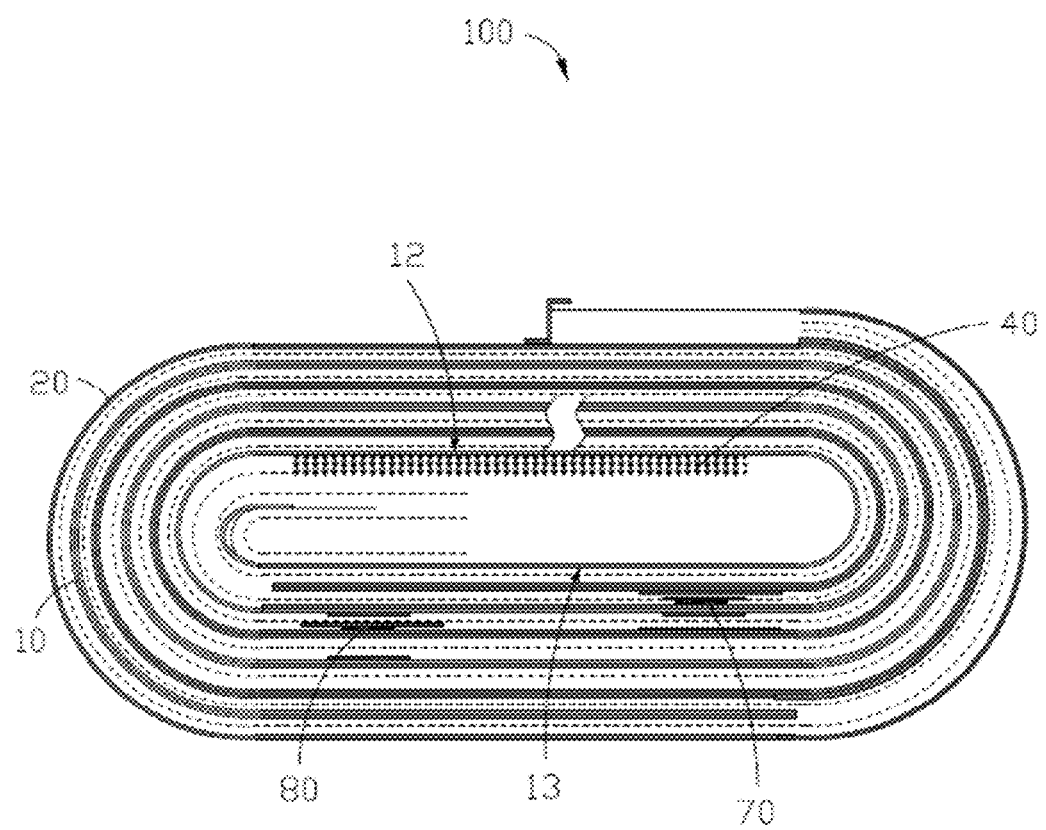
FIG. 6 is a schematic diagram of a jelly-roll structure of an electrode assembly containing the first electrode plate shown in FIG. 5.

Referring to FIG. 1 and FIG. 2, in a first embodiment, an electrode assembly 100 includes a first electrode plate 10, a second electrode plate 20, and a separator 30. The separator 30 is disposed between the first electrode plate 10 and the second electrode plate 20. The electrode assembly 100 is formed by winding the first electrode plate 10, the separator 30, and the second electrode plate 20. The first electrode plate 10 includes a single-surface-coated region 11. The single-surface-coated region 11 is located in a winding initiation layer of the electrode assembly 100 and forms a first uncoated region 12 and a second uncoated region 13 that are disposed oppositely. The electrode assembly 100 further includes a first connecting piece 40. The first connecting piece 40 is disposed on the single-surface-coated region 11. Specifically, the first connecting piece 40 is disposed on a side of the first uncoated region 12, the side facing the second uncoated region 13. The second uncoated region 13 is connected to a side of the first connecting piece 40, the side facing back from the first uncoated region 12. The first uncoated region 12 and the second uncoated region 13 are connected into a whole by the first connecting piece 40, thereby increasing internal rigidity of the electrode assembly 100 and avoiding deformation of the electrode assembly 100 caused by irregular expansion of the single-surface-coated region. A polarity of the first electrode plate 10 is opposite to a polarity of the second electrode plate 20. In this embodiment of this application, the first electrode plate 10 is a negative electrode plate, and the second electrode plate 20 is a positive electrode plate. The first electrode plate 10 includes a first current collector 101 and an active material layer 102. The active material layer 102 is coated onto both surfaces of the first current collector 101. The single-surface-coated region 11 is a region on the first current collector 101, the region in which a single surface of the first current collector is coated with the active material layer 102.

In the prior art, the problem of irregular expansion of the single-surface-coated region is solved by cancelling the single-surface-coated region and directly winding the negative electrode plate coated with active material layers on both sides. However, a winding initiation end coated with two active material layers is unable to be charged and discharged normally, thereby causing adverse effects on an energy density of the electrode assembly and increasing costs of the electrode assembly. Without a need to cancel the single-surface-coated region, the electrode assembly according to this application increases internal rigidity of the electrode assembly by using the first connecting piece, thereby not only avoiding the problem of irregular expansion of the single-surface-coated region but also reducing the adverse effects on the energy density and the costs.

In the first embodiment, the first connecting piece 40 is double-sided tape, and is affixed onto a surface in the first uncoated region 12, the surface facing the second uncoated region 13. The electrode assembly 100 may activate adhesivity of the double-sided tape by hot pressing, so as to bond the first uncoated region 12 to the second uncoated region 13 to form a whole. A material of the first connecting piece 40 may be resin or acrylic acid, and become sticky under specific temperature and pressure conditions. To avoid overflow of the double-sided tape, in a length direction of the electrode assembly 100 (a direction perpendicular to the plane shown in FIG. 2), a length of the first connecting piece 40 is less than or equal to a length of the electrode assembly 100. Referring to FIG. 3 to FIG. 6, in other extended embodiments, the first connecting piece 40 may also be hot-melt adhesive. By plastering or dispensing, the hot-melt adhesive may be disposed on a surface of the single-surface-coated region 11, the surface being coated with no active material layer. Understandably, the first connecting piece 40 includes a plurality of connecting units 41. The plurality of connecting units 41 are spaced out on the surface of the single-surface-coated region 11, the surface being coated with no active material layer.

Referring to FIG. 1 and FIG. 2 again, the winding initiation end of the electrode assembly 100 further includes an ending separator 31 and an empty foil region 14. The ending separator 31 is the winding initiation end of the separator 30. The empty foil region 14 is a region in which both surfaces at an end of the first electrode plate 10 are coated with active material layers. The ending separator 31 overlays the empty foil region 14. To ensure levelness of an innermost coil of the electrode assembly 100, the first connecting piece 40 does not overlap the ending separator 31. To be specific, projections of the first connecting piece 40 and the ending separator 31 do not overlap in the thickness direction of the electrode assembly 100.

In the first embodiment, the winding initiation layer of the first electrode plate 10 and the four layers of separators 30 are stacked at a position at the winding initiation end of the electrode assembly 100, where the position is opposite to the first connecting piece 40. A thickness of the separators 30 is t1, a thickness of the first current collector 101 is t2, and a thickness of the active material layer 102 is t3. In order not to increase an overall thickness of the electrode assembly 100, the thickness t of the first connecting piece 40 satisfies a formula: $t \leq 4 \times t1 + t2 + t3$. In some embodiments, if there is no active material layer 102 at the winding initiation end of the first electrode plate 10, the thickness t of the first connecting piece 40 satisfies a formula: $t \leq 4 \times t1 + t2$. Further, in another optional embodiment, in order to save the separators 30, only two layers of separators 30 are disposed on an inner side of an initial winding coil of the electrode assembly 100, and the thickness t of the first connecting piece 40 satisfies a formula: $t \leq 2 \times t1 + t2$. Understandably, in other embodiments, when the first connecting piece 40 is plastered or dispensed in the single-surface-coated region 11, in the thickness direction of the electrode assembly 100, the thickness of the first connecting piece 40 is less than or equal to the thickness of the first electrode plate 10.

Further, the electrode assembly 100 includes a first tab 70 and a second tab 80. A groove is made on the active material layer 102 of the first electrode plate 10. The first current collector 101 is exposed from the groove. The first tab 70 is disposed in the groove, and is connected to the first current collector 101. The second tab 80 is connected to the second current collector of the second electrode plate 20 in an identical manner. To prevent burrs at a junction between the first tab 70 and the first current collector 101 from scratching the second electrode plate 20 and/or the first electrode plate 10, a bonding piece 90 is affixed to the junction between the first tab 70 and the first electrode plate 10, and a bonding piece 90 is also affixed to corresponding positions on two layers of second electrode plates 20 adjacent to the first electrode plate 70 concurrently. Understandably, the bonding piece 90 may also be affixed to the junction between the second tab 80 and the second electrode plate 20, details of which are omitted here.

The thickness of the first tab is t4, the thickness of the second tab is t5, and the thickness of the bonding piece 90 is t6. In the thickness direction of the electrode assembly 100, if a projection of the first tab 70 overlaps a projection of the ending separator 31, in order to avoid increasing an overall thickness of the electrode assembly 100 and maintain evenness of the overall thickness of the electrode assembly 100, the thickness t of the first connecting piece 40 satisfies a formula: $t \leq (4t1 + t2 + t3) + (t4 + 3t6) - t3$. Understandably, in the thickness direction of the electrode assembly 100, if the projection of the first tab 70 does not overlap the projection of the ending separator 31, the thickness t of the first connecting piece 40 satisfies a formula: $t \leq (4t1 + t2 + t3) - (t4 + 3t6 - t3)$.

Figure 13:
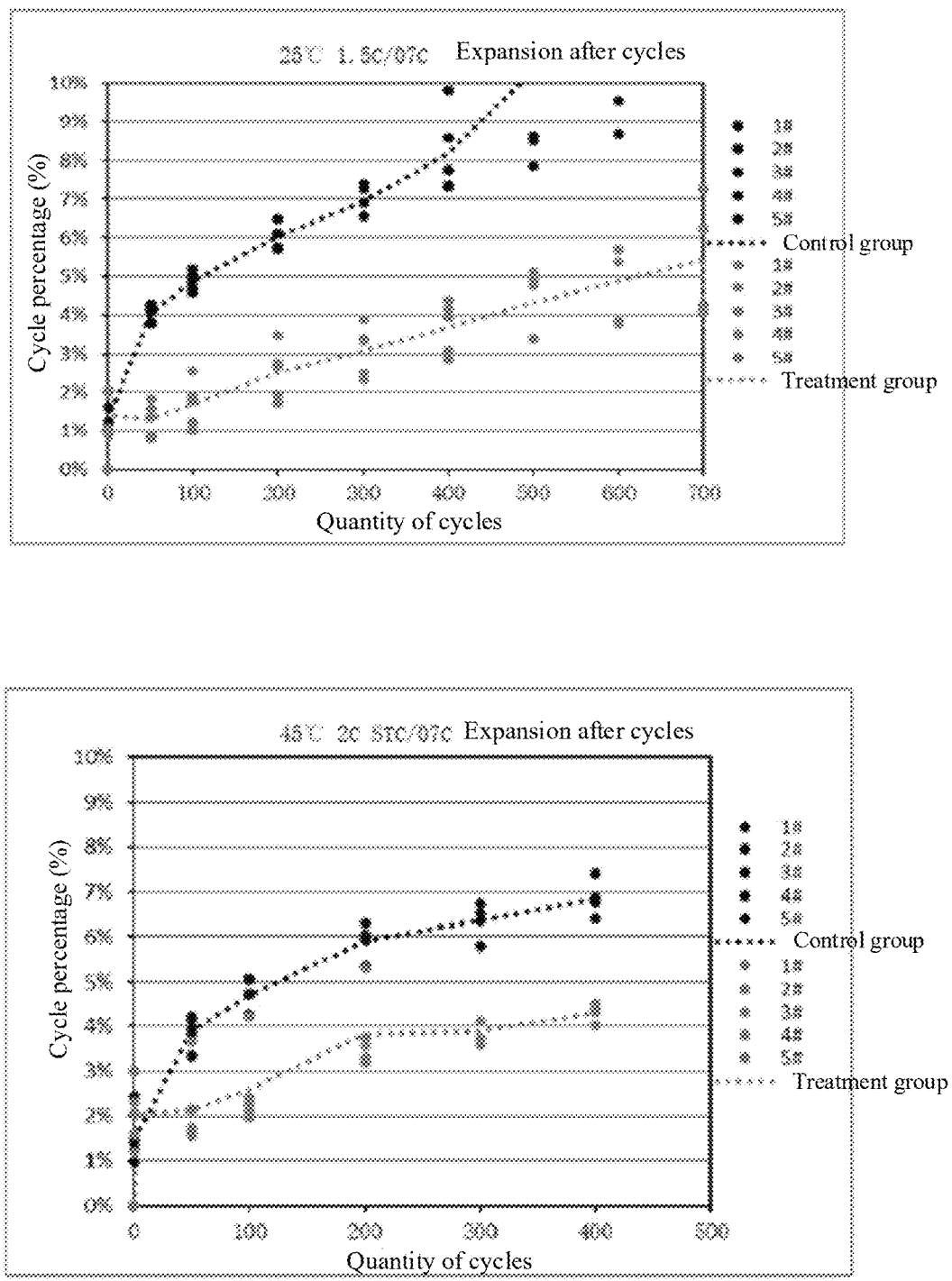
FIG. 13 shows results of a cycle test of an electrode assembly.

A cyclic expansion experiment under two different conditions is performed by using the electrode assembly in this application as a treatment group and using an ordinary electrode assembly, which has no connecting piece disposed in the single-surface-coated region, as a control group. Experimental data is shown in FIG. 13. In a 25° C. cyclic expansion experiment, an expansion percentage of the electrode assembly according to this application is reduced to 6% after 700 cycles. In a 45° C. cyclic expansion experiment, the expansion percentage of the electrode assembly according to this application is reduced to 4% after 400 cycles, being significantly lower than an experimental result of the control group. This proves that the first connecting piece 40 effectively suppresses irregular deformation of the single-surface-coated region 11.

Second Embodiment

Figure 7:
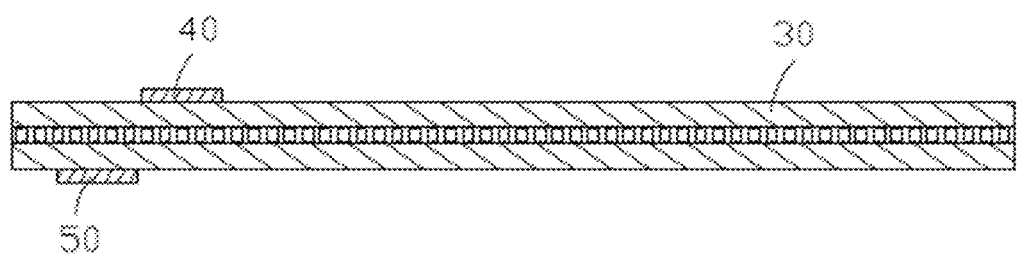
FIG. 7 is a schematic diagram of an expanded structure of a separator of an electrode assembly according to a second embodiment.
Figure 8:
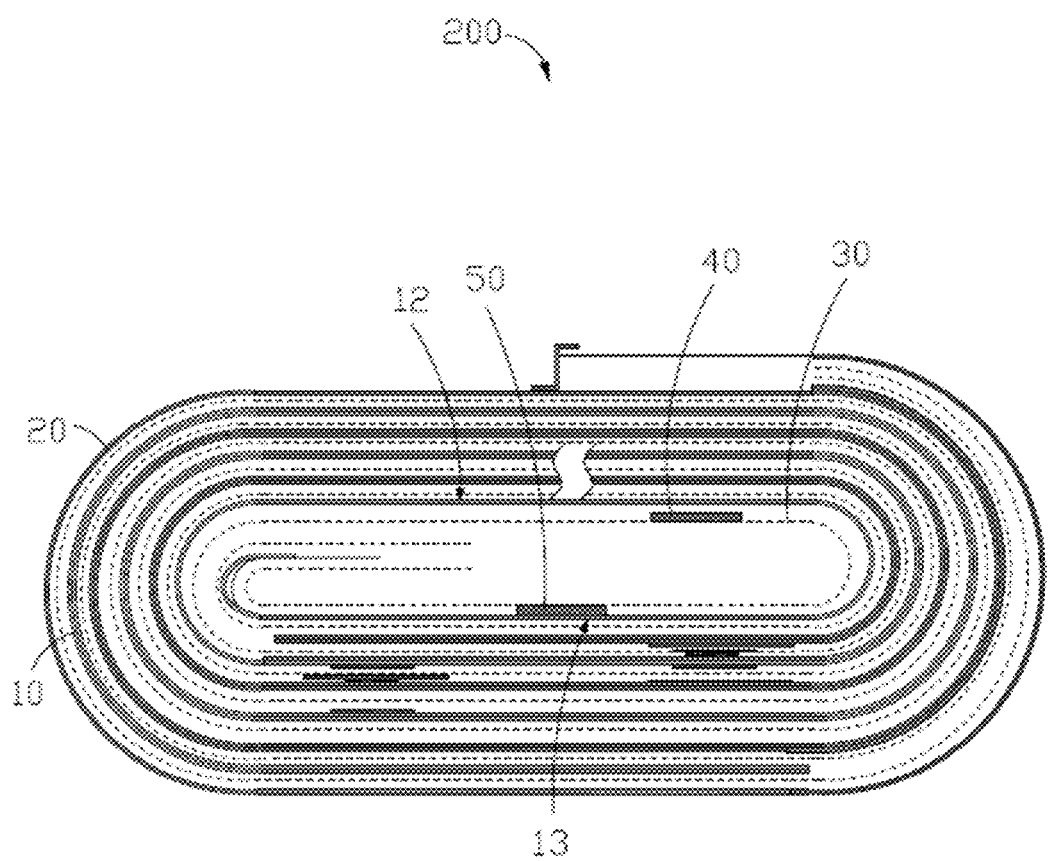
FIG. 8 is a schematic diagram of a jelly-roll structure of an electrode assembly according to a second embodiment.

Referring to FIG. 7 and FIG. 8, an electrode assembly 200 according to a second embodiment is almost identical to the electrode assembly 100 according to the first embodiment, but differs in: in the second embodiment, the separator 30 overlays a surface coated with no active material layer in the single-surface-coated region 11, and the first connecting piece 40 is disposed between the first uncoated region 12 and the separator 30. Further, a second connecting piece 50 is disposed between the second uncoated region 13 and the separator 30. The second connecting piece 50 is configured to fixedly connect the separator 30 and the second uncoated region 13. A material of the second connecting piece 50 is identical to that of the first connecting piece 40, and is double-sided tape. In the second embodiment, the first uncoated region 12 and the second uncoated region 13 are connected into a whole by the first connecting piece 40, the separator, and the second connecting piece 50, so as to increase rigidity of an inner coil interface of the electrode assembly 200 and suppress irregular deformation of the single-surface-coated region 11. Further, to avoid increasing the overall thickness of the electrode assembly 200, the projections of the first connecting piece 40 and the second connecting piece 50 do not overlap in the thickness direction of the electrode assembly 200.

Third Embodiment

Figure 9:
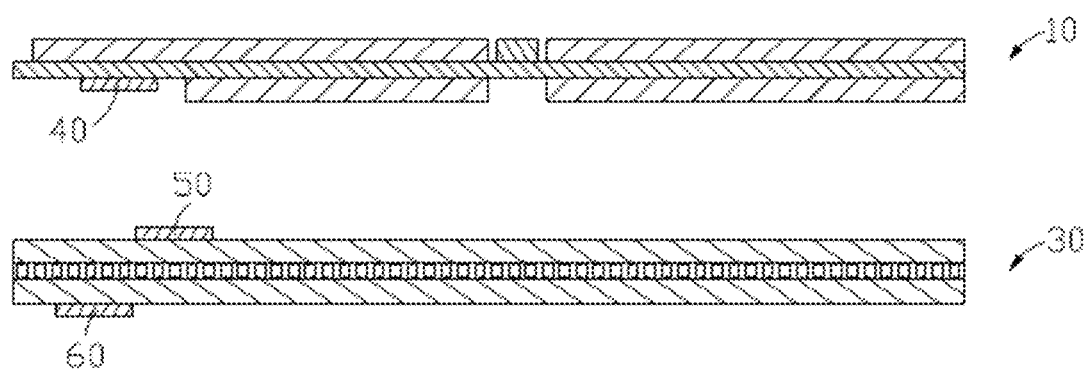
FIG. 9 is a schematic diagram of an expanded structure of a first electrode plate and a separator of an electrode assembly according to a third embodiment.
Figure 10:
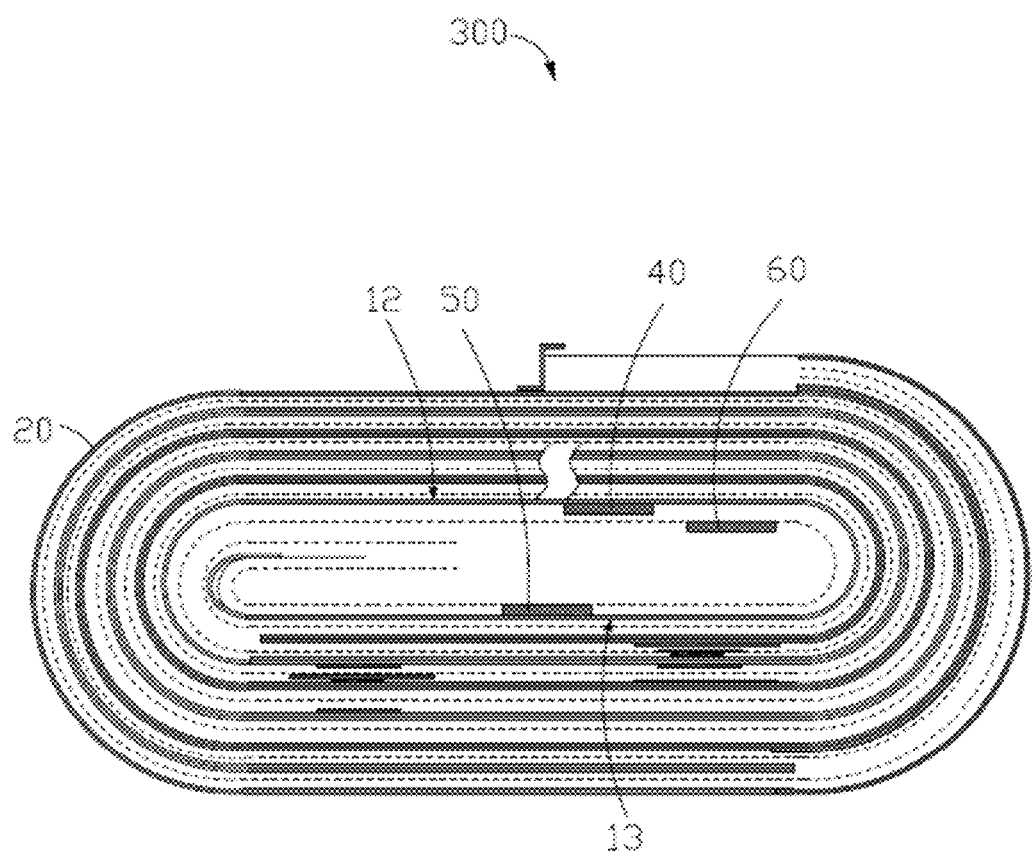
FIG. 10 is a schematic diagram of a jelly-roll structure of an electrode assembly according to a third embodiment.

Referring to FIG. 9 and FIG. 10, an electrode assembly 300 according to a third embodiment differs from the electrode assembly 200 according to the second embodiment in: in the third embodiment, a third connecting piece 60 is further disposed on a side of the separator 30, the side facing back from the first uncoated region 12. In this way, the first uncoated region 12, the separator 30, and the second uncoated region 13 are fixedly connected by the third connecting piece to further increase the rigidity of the electrode assembly 300.

Fourth Embodiment

Figure 11:
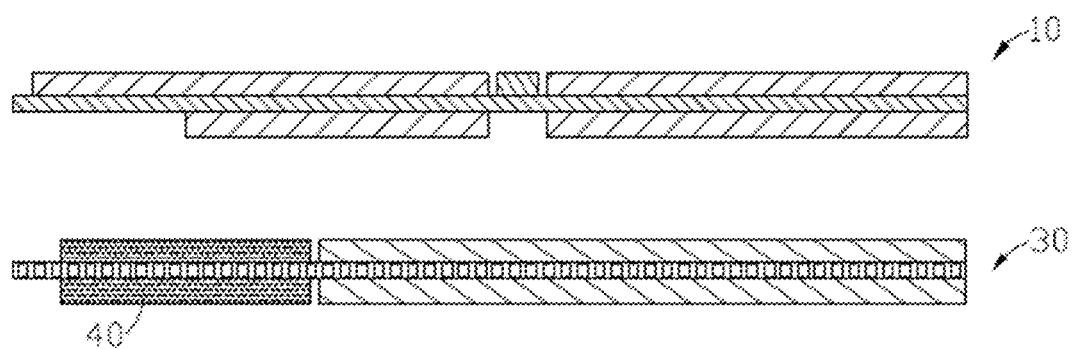
FIG. 11 is a schematic diagram of an expanded structure of a first electrode plate and a separator of an electrode assembly according to a fourth embodiment.
Figure 12:
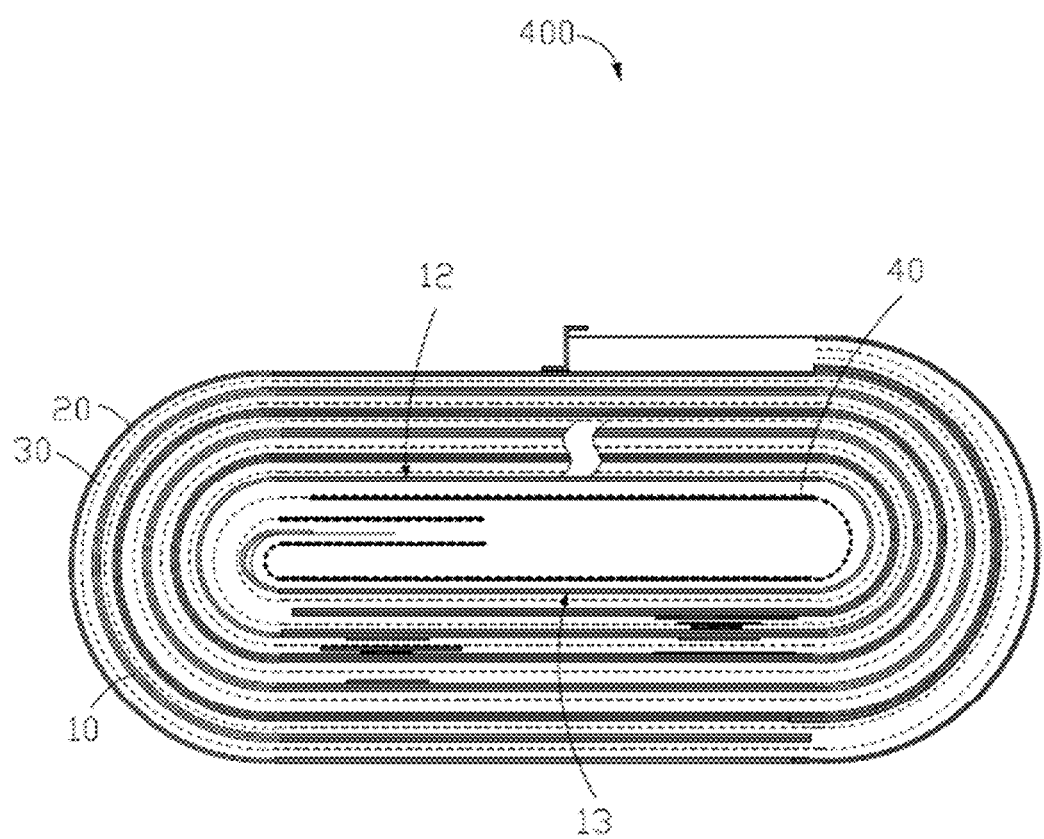
FIG. 12 is a schematic diagram of a jelly-roll structure of an electrode assembly according to a fourth embodiment.

Referring to FIG. 11 and FIG. 12, an electrode assembly 400 according to a fourth embodiment is almost identical to the electrode assembly 100 according to the first embodiment, but differs in: in the fourth embodiment, the first connecting piece 40 extends along a width direction of the electrode assembly 100, and the first connecting piece 40 overlays and connects the first uncoated region 12, the second uncoated region 13, and the ending separator 31.

Specifically, the separator 30 overlaps two opposite surfaces of the first uncoated region 12 and the second uncoated region 13. The first connection piece 40 is a bonding layer disposed on both surfaces of the separator 30 at the winding initiation end. The ending separator 31, the first uncoated region 12, and the second uncoated region 13 are fixedly connected by the bonding layer on the separator 30.

Fifth Embodiment

Figure 14:
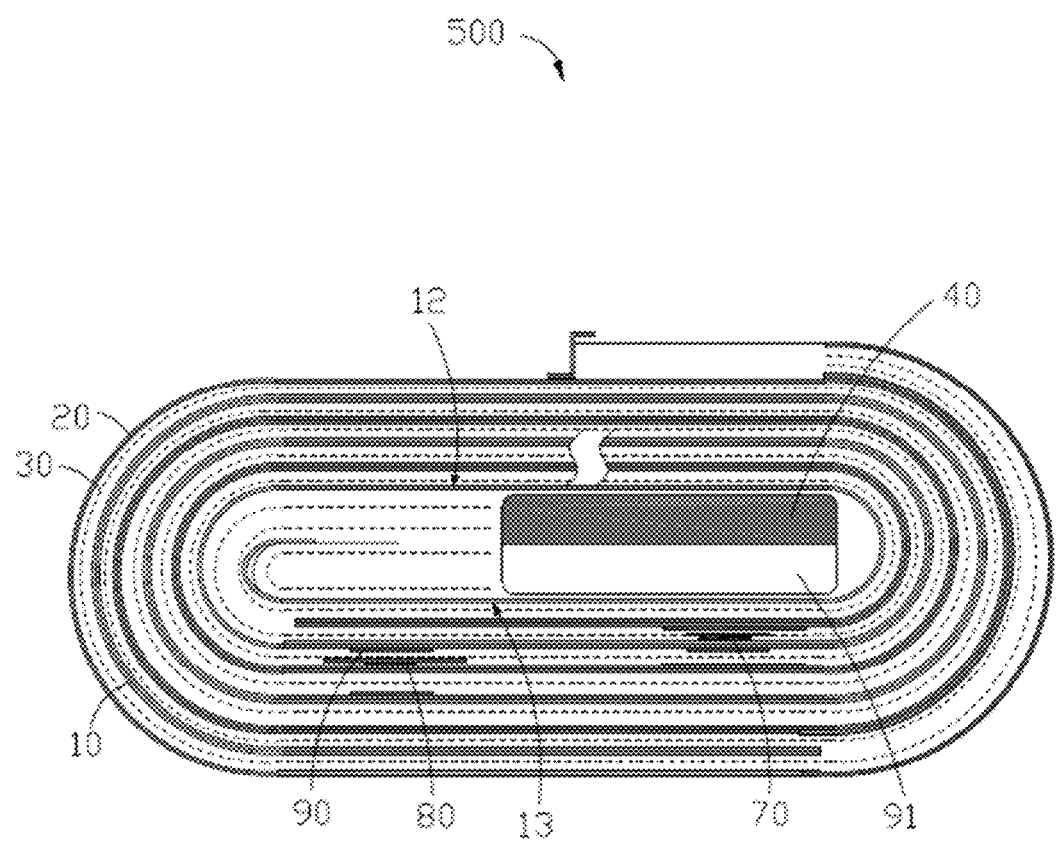
FIG. 14 is a schematic diagram of a jelly-roll structure of an electrode assembly according to a fifth embodiment.

Referring to FIG. 14, an electrode assembly 500 according to a fifth embodiment is almost identical to the electrode assembly 100 according to the first embodiment, but differs in: in the fifth embodiment, the electrode assembly 500 further includes strut 91. The strut 91 is sandwiched between the first uncoated region 12 the second uncoated region 13, so as to support the single-surface-coated region 11 and suppress irregular deformation of the single-surface-coated region 11. The first connecting piece 40 is disposed between the first uncoated region 12 and the strut 91 to connect the strut 91 and the single-surface-coated region 11 and prevent the strut 91 from being detached from the electrode assembly 500.

Figure 15:
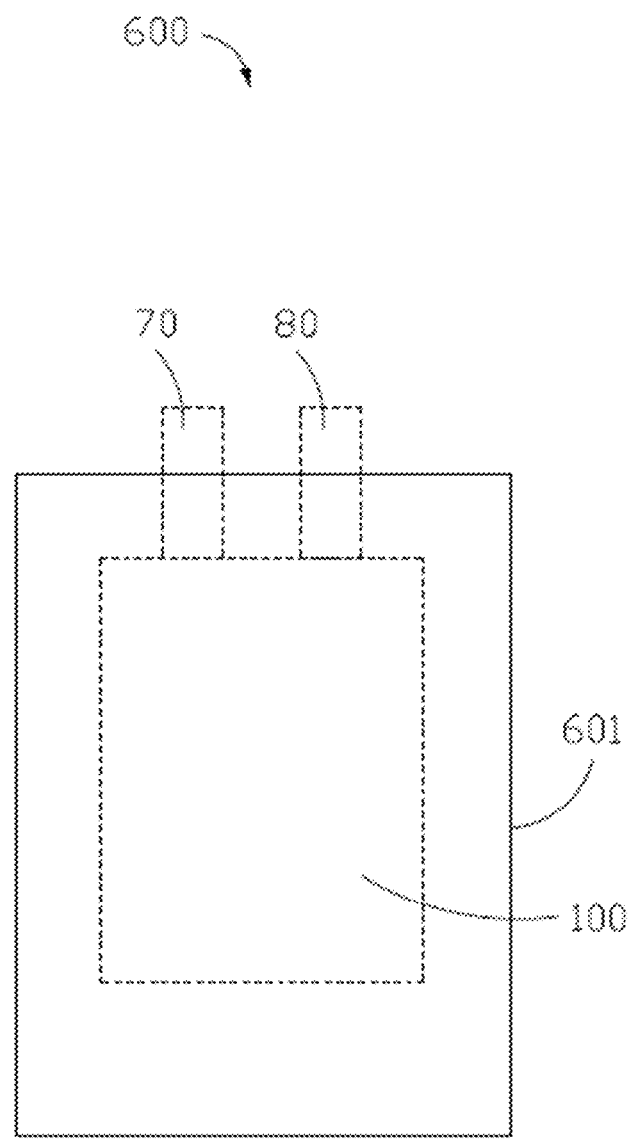
FIG. 15 is a schematic structural diagram of a battery according to an embodiment.

Referring to FIG. 15, this application further provides a battery 600, including the electrode assembly according to any of or a combination of the foregoing embodiments and including a package 601. The package 601 accommodates the electrode assembly. Tabs of the electrode assembly extend out of the package 601.

The foregoing embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the spirit and scope of the technical solutions of this application.

What is claimed is:

1. An electrode assembly, comprising:
a first electrode plate;
a second electrode plate; and
a separator, wherein the separator is disposed between the first electrode plate and the second electrode plate, and the electrode assembly is formed by winding the first electrode plate, the separator, and the second electrode plate;
wherein the first electrode plate comprises a single-surface-coated region, the single-surface-coated region is located in a winding initiation layer of the electrode assembly and forms a first uncoated region and a second uncoated region that are disposed oppositely; the electrode assembly further comprises a first connecting piece, and a first side of the first connecting piece is directly connected to a side of the first uncoated region, the side facing the second uncoated region; and the second uncoated region is directly connected to a second side of the first connecting piece, the first side of the first connecting piece and the second side of the first connecting piece are two opposite sides of the first connecting piece in a direction perpendicular to a width direction of the electrode assembly, and
the first connecting piece extends in the width direction of the electrode assembly, and the first connecting piece overlays and directly connects with the first uncoated region and the second uncoated region, respectively.

2. The electrode assembly according to claim 1, wherein the first connecting piece is double-sided tape, and is affixed onto a surface in the first uncoated region, the surface facing the second uncoated region.

3. The electrode assembly according to claim 1, wherein the separator overlays a surface coated with no active material layer in the single-surface-coated region, and the first connecting piece is disposed between the first uncoated region and the separator.

4. The electrode assembly according to claim 3, wherein a second connecting piece is disposed between the second uncoated region and the separator, and the second connecting piece is configured to fixedly connect the separator and the second uncoated region.

5. The electrode assembly according to claim 4, wherein projections of the first connecting piece and the second connecting piece do not overlap in a thickness direction of the electrode assembly.

6. The electrode assembly according to claim 4, wherein a third connecting piece is disposed on a side of the separator, the side facing back from the first uncoated region; and the first uncoated region, the separator, and the second uncoated region are fixedly connected by the third connecting piece.

7. The electrode assembly according to claim 1, further comprising a strut, and the strut is sandwiched between the first uncoated region and the second uncoated region.

8. The electrode assembly according to claim 7, wherein the first connecting piece is disposed between the first uncoated region and the strut.

9. The electrode assembly according to claim 1, wherein, in a length direction of the electrode assembly, a length of the first connecting piece is less than or equal to a length of the electrode assembly.

10. The electrode assembly according to claim 1, wherein, in a thickness direction of the electrode assembly, a thickness of the first connecting piece is less than or equal to a thickness of the first electrode plate.

11. The electrode assembly according to claim 1, wherein the first connecting piece comprises a plurality of connecting units, and the plurality of connecting units are spaced out on a surface of the single-surface-coated region, the surface being coated with no active material layer.

12. A battery, comprising an electrode assembly and a package, the package accommodates the electrode assembly, and tabs of the electrode assembly extend out of the package, wherein the electrode assembly comprising:
   a first electrode plate;
   a second electrode plate; and
   a separator, wherein the separator is disposed between the first electrode plate and the second electrode plate, and the electrode assembly is formed by winding the first electrode plate, the separator, and the second electrode plate;
   wherein the first electrode plate comprises a single-surface-coated region, the single-surface-coated region is located in a winding initiation layer of the electrode assembly and forms a first uncoated region and a second uncoated region that are disposed oppositely; the electrode assembly further comprises a first connecting piece, and a first side of the first connecting piece is directly connected to a side of the first uncoated region, the side facing the second uncoated region; and the second uncoated region is directly connected to a second side of the first connecting piece, the first side of the first connecting piece and the second side of the first connecting piece are two opposite sides of the first connecting piece in a direction perpendicular to a width direction of the electrode assembly, and
   the first connecting piece extends in the width direction of the electrode assembly, and the first connecting piece overlays and directly connects with the first uncoated region and the second uncoated region, respectively.

13. The battery according to claim 12, wherein the first connecting piece is double-sided tape, and is affixed onto a surface in the first uncoated region, the surface facing the second uncoated region.

14. The battery according to claim 12, wherein the separator overlays a surface coated with no active material layer in the single-surface-coated region, and the first connecting piece is disposed between the first uncoated region and the separator.

15. The battery according to claim 14, wherein a second connecting piece is disposed between the second uncoated region and the separator, and the second connecting piece is configured to fixedly connect the separator and the second uncoated region.

16. The battery according to claim 15, wherein projections of the first connecting piece and the second connecting piece do not overlap in a thickness direction of the electrode assembly.

17. The battery according to claim 15, wherein a third connecting piece is disposed on a side of the separator, the side facing back from the first uncoated region; and the first uncoated region, the separator, and the second uncoated region are fixedly connected by the third connecting piece.

18. The battery according to claim 12, wherein the electrode assembly further comprises a strut, and the strut is sandwiched between the first uncoated region and the second uncoated region.

* * * * *